United States Patent [19]

Lauzier

[11] 4,395,603
[45] Jul. 26, 1983

[54] REAR "STOP" LIGHT CONTACTOR FOR A VEHICLE SUCH AS A MOTORCYCLE OR MOTOR BICYCLE

[75] Inventor: René Lauzier, Ruy, France

[73] Assignee: Angenieux-Clb S.A., Saint-Etienne, France

[21] Appl. No.: 311,453

[22] Filed: Oct. 14, 1981

[30] Foreign Application Priority Data

Oct. 14, 1980 [FR] France ............................. 80 22198

[51] Int. Cl.³ ............................................. H01H 9/06
[52] U.S. Cl. .................................. 200/61.87; 340/134
[58] Field of Search ............... 200/61.87, 61.85, 61.12; 340/69, 134, 91, 93

[56] References Cited

U.S. PATENT DOCUMENTS

| 3,188,418 | 6/1965 | Pino | 340/69 X |
| 4,031,343 | 6/1977 | Sopko | 200/61.87 X |
| 4,275,280 | 6/1981 | Yamazaki | 200/61.87 X |

Primary Examiner—A. T. Grimley
Assistant Examiner—Morris Ginsburg
Attorney, Agent, or Firm—Karl F. Ross; Herbert Dubno

[57] ABSTRACT

A handlebar brake for a motorcycle, motor bicycle or the like comprises a support for the brake lever which is biased into its rest position by a restoring spring. The restoring spring handles a hollow contactor body in recess of the support and this body contains a rocker which has a formation reaching through an opening in the body and spring biased for contact with the lever. When the lever is actuated, a movable contact on the rocker engages between stationary contact blades in the body to complete an electric circuit to the stop light.

4 Claims, 2 Drawing Figures

REAR "STOP" LIGHT CONTACTOR FOR A VEHICLE SUCH AS A MOTORCYCLE OR MOTOR BICYCLE

FIELD OF THE INVENTION

This invention relates to a rear stop light contactor placed on the handlebar of a two-wheel motor vehicle such as a motorcycle and motor bicycle. This contactor generally electrically energizes a lamp located at the rear of the vehicle, as soon as the driver actuates a brake lever.

BACKGROUND OF THE INVENTION

At present, contactors of this type are members inserted in the handlebar, which gives rise to various drawbacks: bulkiness, requirement for a special fastening means, insufficient protection.

OBJECT OF THE INVENTION

This invention has as its object the correction of these drawbacks by providing a new solution in which there is an "integration" of the contactor in the brake components.

SUMMARY OF THE INVENTION

The rear stop light contactor for the motorcycle or motor bicycle, which is the subject of this invention, comprises a hollow body mounted in a housing of the support to which is articulated the brake lever. This body contains a rocker lever bearing at least one movable electric contact and having a part which projects through an opening of said body to bear against a face of the brake lever, under the effect of a spring acting on said rocker and housed in the hollow body.

This contact carrier, being entirely housed in the support to which is articulated the brake lever, is perfectly protected and has a minimum bulkiness.

According to a preferred embodiment of the invention, the release spring of the brake lever is pressed against a protuberance from the hollow body of the contact carrier, so as to maintain the contact carrier in place at the bottom of its housing in the support to which the brake lever is articulated. The retention of the contact carrier is thus ensured without any additional fastening member which results in simplification and economy.

Advantageously, each electric contact of the rocker is provided as an insert made of conductive material, oriented radially and cooperating with a pair of parallel conductive blades forming the counter contacts. These blades are connected to the wires of the vehicle electric network. The number of inserts and of blade pairs can be chosen freely so as to obtain an unipolar, bipolar or even multipolar contact system without modifying the rest of the structure of this contact carrier. With such an arrangement, the electric connection is made by frictional sliding of a conductive insert on the conductive blades, whereas most commercial contactors provide this function by simple pressure which results in rapid oxidation of the contacts.

The switch of this invention, still has other advantages in that it provides for passage of electric wires on the inside of the body as a single bundle and is easy to assemble.

BRIEF DESCRIPTION OF THE DRAWING

In any case, the invention will be more fully understood in the light of the following description, with reference to the appended schematic drawing showing, by way of a non limiting example, an embodiment of a rear stop light contactor for a vehicle such as a motorcycle or motor bicycle.

IN THE DRAWING

Figure 1:
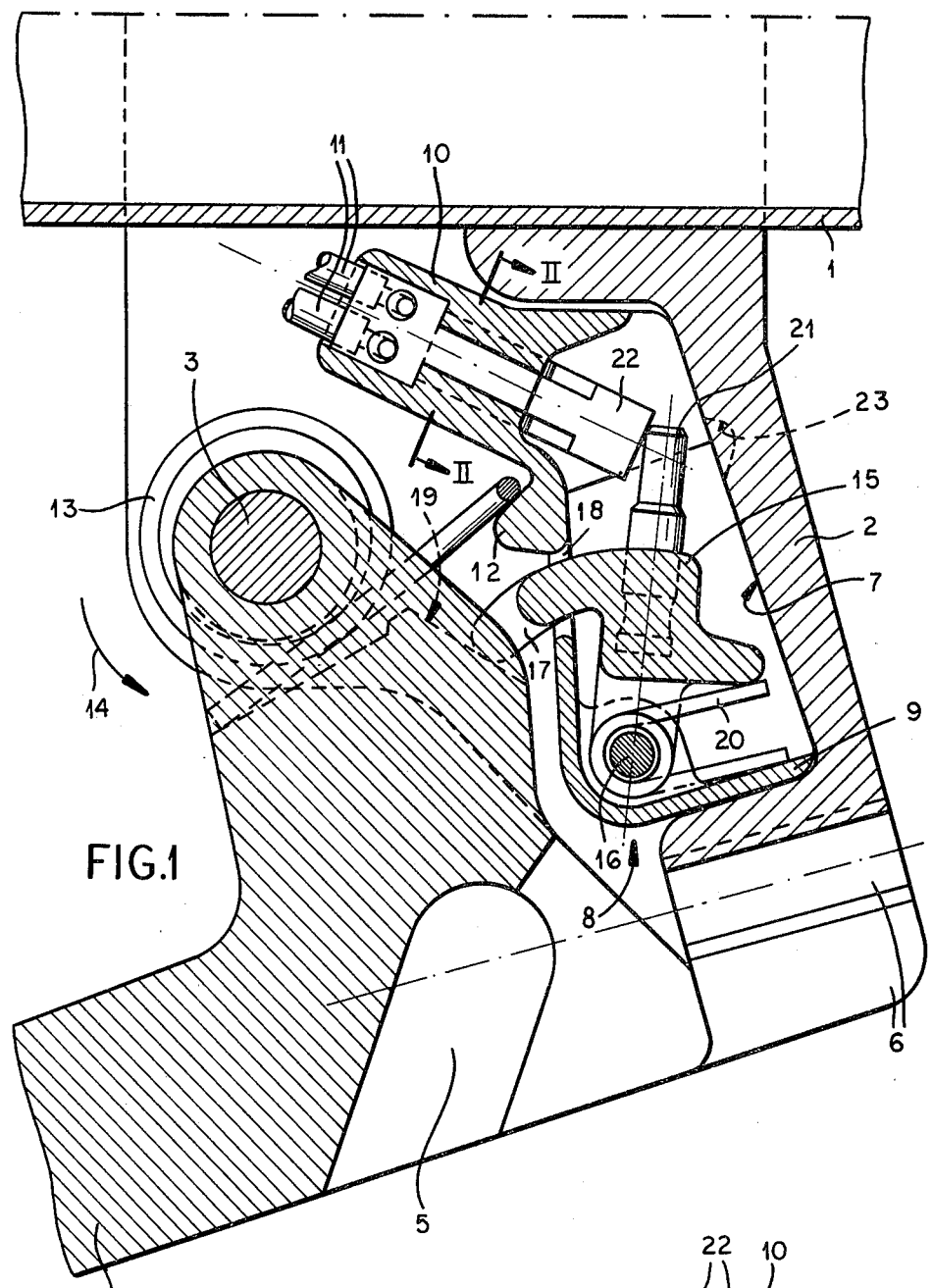
Figure 2:
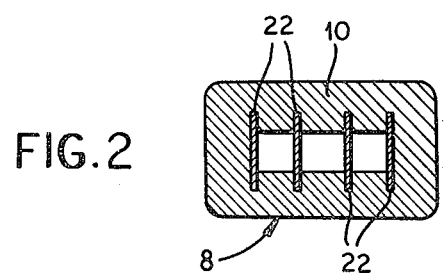

FIG. 1 is a longitudinal section, of the contactor of this invention, showing the structure and assembly of the latter; and FIG. 2 is a section of this contactor along line 2—2 of FIG. 1.

SPECIFIC DESCRIPTION

FIG. 1 shows partially handlebar 1 of a motorcycle, near one of its extremities, and a support bracket 2 on which a brake lever 4 pivots about axis 3. The latter ensures, in a conventional manner, control of braking through a cable in a sheath, not shown. The head of the cable is held in a housing 5 of lever 4 and passes through support 2 via a slit 6.

Support 2 has a recess 7, delimited by its two lateral walls, by its wall opposite axis 3 and by its two parts respectively close to handle bar 1 and slit 6. Recess 7 receives body 8 of the stop light contactor. This body 8 is divided into a hollow part 9, which fits into recess 7 and includes the internal members of the contactor, and into a more massive part 10, into which a bundle of electric wires 11 extends. Body 8 of the contactor further comprises a protuberance 12 turned towards axis 3 of brake lever 4. A torsion spring 13, wound around said axis 3 and bearing, on the one hand, against lever 4, and on the other hand, against protuberance 12, provides both for the return of lever 4, in the direction of arrow 14, and the maintenance in place of body 8 at the bottom of recess 7.

The hollow part 9 of body 8 contains a rocker 15, mounted so as to pivot around an axis 16 parallel to axis 3 of brake lever 4. Rocker 15 comprises a double finger 17, which extends from body 8 through an opening 18 and which bears against faces 19 of lever 4. This bearing is ensured by a torsion spring 20 housed on the inside of hollow part 9, spring 20 being wound around pivot 16 and applied, on the one hand, against the internal wall of the body, and on the other hand, against rocker 15.

Rocker 15 has two inserts 21 made of conductive material, oriented radially relative to axis 16. These inserts 21 cooperate, respectively, with two pairs of parallel conductive blades 22, which can be easily seen in FIG. 2, which are connected to respective electric wires 11.

When brake lever 4 is actuated and pivots around axis 3 in the direction opposite to that of arrow 14, rocker 15, released by lever 4 and pushed by spring 20, pivots around axis 16, so that inserts 21 come closer to blades 22 and come into contact with the latter, thus setting up the passage of the electric current in wires 11 which supply the rear stop light. When brake lever 4 is released, spring 13 urges it back into a resting position and simultaneously, lever 4 pushes back rocker 15, so as to move away inserts 21 of blades 22, which interrupts the electric contact. In the resting position, the free extremities of inserts 21 can be engaged in recesses 23 of support 2.

It is self-evident that the invention is not limited to the only embodiment of this rear stop light contactor described above by way of example; it encompasses, on the contrary, all varying embodiments and applications conceived along the same principle. Thus, the modification of the detailed forms of parts such as body 8 and rocker 15, or still the provision, along the same design, of a unipolar contactor (therefore, with a single insert 21 and a single pair of blades 22) instead of the bipolar contactor described above, would not constitute a departure from the scope of the invention. Finally, the type or category of the vehicle can be chosen among any number of them: motorcycle, motor bike, motor bicycle, or scooter.

I claim:

1. A brake actuator and contactor assembly for a brake light energized upon brake actuation, comprising:
   a support;
   a brake lever pivotally mounted on said support, said support having a recess opened toward said lever; and
   a contactor at least partly received in said recess, said contactor comprising:
      a hollow body formed with at least one stationary contact within said body,
      a rocker pivotally mounted in said body in a portion thereof extending into said recess and having a formation projecting from said body through an opening formed therein and engageable with said lever,
      a spring in said body urging said rocker toward said lever, and
      a movable contact on said rocker engageable with said stationary contact to energize the brake light upon actuation of said rocker by said spring to cause said formation to follow said lever.

2. The assembly defined in claim 1 comprising a restoring spring acting on said lever for swinging it into a rest position upon release of said lever to inactivate the brake, said body having a protuberance engaged by said restoring spring whereby said restoring spring retains said body in said recess.

3. The assembly defined in claim 1 wherein said movable contact is an insert of conductive material received in said rocker and said stationary contact comprises a pair of parallel conductive blades.

4. The assembly defined in claim 2 wherein said movable contact is an insert of conductive material received in said rocker and said stationary contact comprises a pair of parallel conductive blades.

* * * * *